(No Model.)
A. T. MATTHEWS.
SHEET METAL KNOB.
No. 392,874. Patented Nov. 13, 1888.
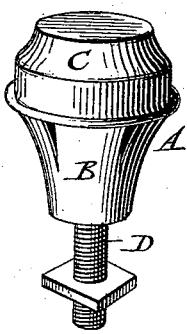
Fig. 1.
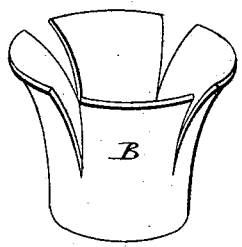
Fig. 3.
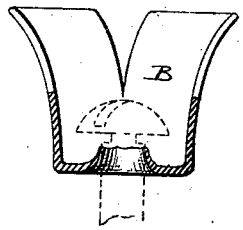
Fig. 4.
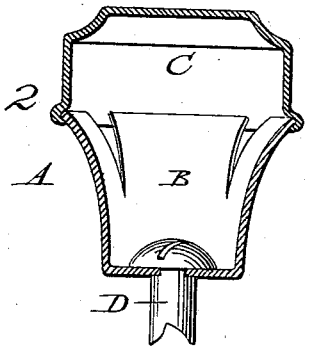
Fig. 2.
Fig. 5.
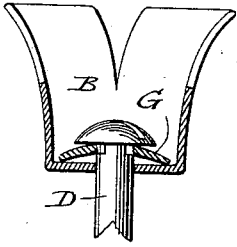
Fig. 6.
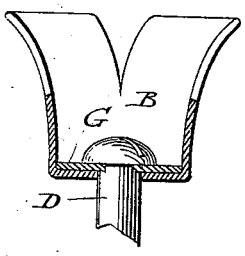
Fig. 7.
Attest
Sidney P. Hollingsworth
Horace A. Dodge
Inventor:
Ambrose T. Matthews
by Dodge Sons,
Attys.

UNITED STATES PATENT OFFICE.

AMBROSE T. MATTHEWS, OF WORCESTER, MASSACHUSETTS, ASSIGNOR TO THE WORCESTER FERRULE COMPANY.

SHEET-METAL KNOB.

SPECIFICATION forming part of Letters Patent No. 392,874, dated November 13, 1888.

Application filed April 9, 1888. Serial No. 270,059. (No model.)

*To all whom it may concern:*

Be it known that I, AMBROSE T. MATTHEWS, of Worcester, in the county of Worcester and State of Massachusetts, have invented certain new and useful Improvements in Sheet-Metal Knobs, of which the following is a specification.

My invention relates to knobs designed more particularly for stove-doors, but which are equally applicable to other and analogous uses, and is designed as an improvement upon the knob for which Letters Patent of the United States, No. 354,607, were issued to me December 21, 1886.

The invention has reference to that class of knobs which are made of sheet metal and struck up in suitably-formed dies to give the necessary shape or configuration to the knob, the invention consisting in a novel means for securing the screw stem or shank to the knob.

In the accompanying drawings, Figure 1 is a perspective view of my improved knob; Fig. 2, a vertical sectional view of the same; Fig. 3, a perspective view of the main body of the knob; Fig. 4, a vertical sectional view of the same; Figs. 5, 6, and 7, detail views illustrating a modified arrangement for securing the screw-stem to the knob.

A indicates the knob as a whole, comprising a body, B, cap C, and stem or shank D.

The blank from which the main body of the knob is made may be made of brass or any other suitable material, and after it is struck up into proper shape, as illustrated in Fig. 3, a hole is punched or otherwise formed in the base of the body B. This hole will advisably, though not necessarily, be made oval or elongated, and its sides will be turned inward slightly, as shown in Fig. 4, so as to form small burrs or flanges.

The shank D will be provided with a head, and will be slightly indented on two of its opposing faces directly under the head, as shown in Figs. 2, 6, and 7, and said shank may or may not be threaded. In the drawings I have shown it threaded and provided with a nut, by which the knob is secured in place upon the stove or other article; but it is obvious that the shank may be made plain and riveted or otherwise secured to the stove-door.

The shank D is passed through the opening in the base of the body B, with the under side of its head resting upon the inwardly-turned edges surrounding the opening in the base of the body, and by forcing the shank down into the body until the under face of its head comes into contact with the body of the shell or body B the inwardly-projecting flanges or burrs will be forced or crowded into the notches or indentations formed in the sides of the shank, as more clearly shown in Fig. 2.

In some cases the material of which the knob is formed will be so light as to preclude this mode of attaching the shank, and in such case I will employ a washer, G, (shown in Figs. 5, 6, and 7,) which washer will be perforated to receive the shank, and will be preferably saucer-shaped, as shown in Figs. 5 and 6.

The perforation in the washer will advisably be like that shown in Fig. 5—that is, it will be oblong or oval and provided with upwardly-projecting burrs or flanges surrounding the opening, which are adapted to enter into the notches or indentations formed under the head of the shank. Now, as the shank is driven to its seat, the washer is flattened out until its periphery or edge bears against the inner side walls of the body B with sufficient force to retain itself in place, thereby forming in effect a part of the bottom of the body or knob. As it is thus flattened out, the burrs or flanges surrounding the opening are forced into the guides or indentations under the head of the shank, as clearly shown in Fig. 7, thereby securing the shank rigidly in position.

The cap C, which is secured to the body or shell B, will be of the ordinary construction, and need not be specifically described herein.

Having thus described my invention, what I claim is—

1. In a knob, the combination, with the body B, having an opening in its base, of a notched shank, D, adapted to fit into the opening.

2. In combination with the body B, having an opening in the base provided with inwardly-projecting burrs or flanges, a shank, D, notched on its opposite faces and inserted into the opening, all substantially as shown.

3. In combination with the body B, having an opening in its base and provided with inwardly-projecting burrs or flanges around said opening, a threaded shank, D, provided with a head and with notches or indentations immediately under said head.

In witness whereof I hereunto set my hand in the presence of two witnesses.

AMBROSE T. MATTHEWS.

Witnesses:
C. F. STEVENS,
W. A. BOYCE.